UNITED STATES PATENT OFFICE.

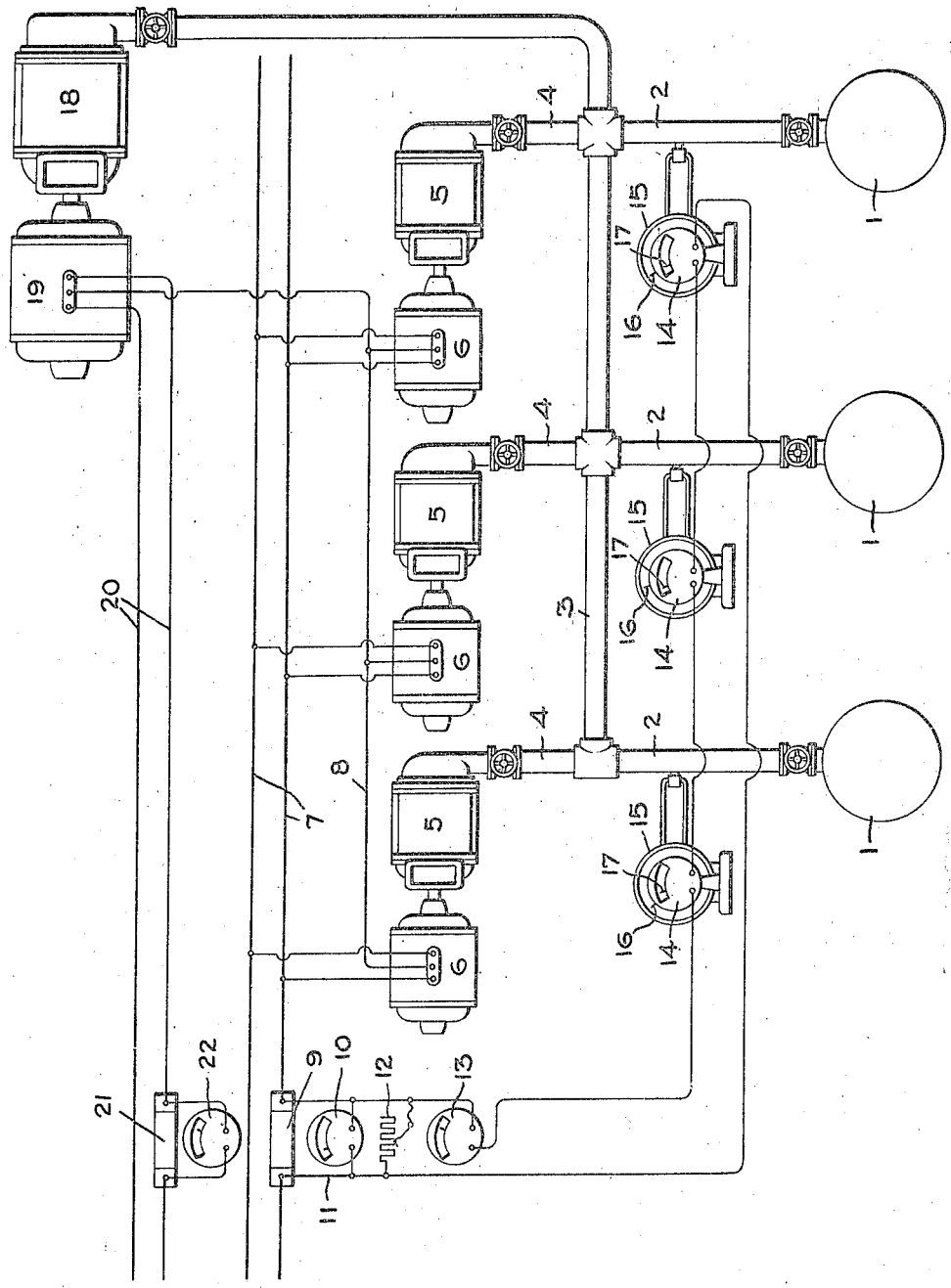

JAMES WILKINSON, OF BOSTON, MASSACHUSETTS, ASSIGNOR TO GENERAL ELECTRIC COMPANY, A CORPORATION OF NEW YORK.

COMBINED ELECTRIC INDICATOR AND STEAM-FLOW METER.

1,076,473. Specification of Letters Patent. Patented Oct. 21, 1913.

Application filed June 21, 1912. Serial No. 704,939.

*To all whom it may concern:*

Be it known that I, JAMES WILKINSON, a citizen of the United States, residing at Boston, in the county of Suffolk, State of Massachusetts, have invented certain new and useful Improvements in Combined Electric Indicators and Steam-Flow Meters, of which the following is a specification.

This invention relates to devices for enabling the firemen tending the several units in a battery of steam boilers to obtain from each boiler its proportionate share of the total output of the battery.

To this end the invention consists in a system of electric indicators combined with steam flow meters, as hereinafter set forth and particularly pointed out in the claims.

The accompanying drawing is a diagram showing one embodiment of the invention.

Three boilers 1 are represented in the drawing, but the number is immaterial. They are connected by risers 2 to a header 3 from which the steam is led by one or more mains 4 to one or more engines, such as the turbines 5, driving the electric generators 6. In the drawing three generators are shown, feeding in parallel into the busbars 7. When more than one generator is used, they are preferably connected by an equalizer conductor 8.

In one of the busbars is a series resistance 9, and in shunt thereto is an ammeter 10. A shunt circuit 11 is thrown around this ammeter, controlled by an adjustable rheostat 12. In this circuit is a master ammeter 13, which is in series with a plurality of auxiliary ammeters 14, each adjacent to its respective boiler 1. In the riser 2 of each boiler is inserted the pressure-difference nozzle of a flow meter 15, which is arranged adjacent to the auxiliary ammeter 14; preferably in such a way that the target 16 of said meter swings over a scale concentric with that of the ammeter needle 17.

The main ammeter 10 of course indicates the total current flowing in the busbars. Assuming a load of 900 amperes on the three generators, the needle of the ammeter 10 will stand at that figure on its scale. The station operator will then move the arm of the adjustable rheostat 12 until the needle of the master ammeter 13 coincides with an indication of 300 amperes on its scale. This permits a small current to flow through the auxiliary ammeters 14, whose needles will all move to the 300 mark on their scales. In this way each fireman will be informed as to what share of the total load his boiler should take care of and will thereupon handle his fire so as to cause the target of his flow meter to coincide with the needle of his ammeter. If the total load changes, the needles of all the auxiliary ammeters will shift in correspondence with that of the master ammeter 13, and each fireman will work his fire to cause the target of his flow meter to follow the variations of the ammeter needle.

The drawing shows an additional engine 18 driving a generator 19 and feeding the busbars 20. A series resistance 21 is in circuit with one of said busbars, shunted by an ammeter 22, which is located preferably adjacent to the ammeters 10 and 13. With this arrangement, the operator adds the reading of the ammeter 22 to that of the ammeter 10 and divides the total by the number of boilers in service, to obtain the share of each. The rheostat 12 is then adjusted accordingly to cause each auxiliary ammeter to indicate said share of the total output.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In a system comprising a plurality of boilers, a common header into which they feed, a flow meter for each boiler, one or more steam driven electric generators and bus bars connected with said generators, the combination with a series resistance in one of said bus bars and means for indicating the total output of said generators, of means in shunt to said resistance for indicating the share of such load which each boiler should carry, and means located adjacent to each boiler for indicating such share.

2. In a system comprising a plurality of boilers, a common header into which they feed, a flow meter for each boiler, one or more steam driven electric generators and bus bars connected with said generators, the combination with a series resistance in one of said bus bars and means for indicating the total output of said generator, of adjustable means in shunt to said resistance for indicating the share of such load which each boiler should carry, and means adjacent to each flow meter for indicating such share.

3. In a system comprising a plurality of boilers, a common header into which they feed, a flow meter for each boiler, one or more steam driven electric generators, and bus bars connected with said generators, the combination with a series resistance in one of said bus bars, of an ammeter in shunt thereto, a controllable circuit in shunt to said ammeter, and auxiliary ammeters in series therein and adjacent to the respective flow meters.

4. In a system comprising a plurality of boilers, a common header into which they feed, a flow meter for each boiler provided with a target, one or more steam driven electric generators, and bus bars connected with said generators, the combination with a series resistance in series with one of said bars, of an ammeter in shunt thereto, a circuit in shunt to said ammeter, means for regulating said circuit, a master ammeter in said circuit, and auxiliary ammeters in series therewith and adjacent to the respective flow meters, said auxiliary ammeters having needles moving concentric with the targets of said flow meters.

In witness whereof, I have hereunto set my hand this 19th day of June, 1912.

JAMES WILKINSON.

Witnesses:
FRANK E. WILSON,
N. L. GANNON.